(12) United States Patent
Niemi et al.

(10) Patent No.: US 10,934,480 B2
(45) Date of Patent: Mar. 2, 2021

(54) OPTICAL ARTICLES COMPRISING PHOTOCHROMIC POLY(UREA-URETHANE)

(71) Applicant: Younger Mfg. Co., Torrance, CA (US)

(72) Inventors: Kevin Michael Niemi, Fullerton, CA (US); David Mark Ambler, Rancho Palos Verdes, CA (US)

(73) Assignee: Younger Mfg. Co., Torrance, CA (US)

( * ) Notice: Subject to any disclaimer, the term of this patent is extended or adjusted under 35 U.S.C. 154(b) by 381 days.

(21) Appl. No.: 15/909,841

(22) Filed: Mar. 1, 2018

(65) Prior Publication Data

US 2018/0251675 A1 Sep. 6, 2018

Related U.S. Application Data

(60) Provisional application No. 62/465,639, filed on Mar. 1, 2017.

(51) Int. Cl.
*B29D 11/00* (2006.01)
*C09K 9/02* (2006.01)
(Continued)

(52) U.S. Cl.
CPC .......... *C09K 9/02* (2013.01); *B29D 11/00009* (2013.01); *B29D 11/00653* (2013.01); *B29D 11/00865* (2013.01); *C08G 18/10* (2013.01); *C08G 18/324* (2013.01); *C08G 18/44* (2013.01); *C08G 18/6651* (2013.01); *C08G 18/6685* (2013.01); *C08G 18/75* (2013.01); *C08K 5/1545* (2013.01); *C09D 175/04* (2013.01);
(Continued)

(58) Field of Classification Search
CPC .................................. B29D 1/00; B29D 11/00
See application file for complete search history.

(56) References Cited

U.S. PATENT DOCUMENTS 3,051,054 A * 8/1962 Crandon .............. G02B 5/3033
359/487.02
3,248,460 A * 4/1966 Naujokas ......... B29D 11/00413
264/1.7
(Continued)

FOREIGN PATENT DOCUMENTS

JP 2001026630 A 1/2001

OTHER PUBLICATIONS

European Union Intellectual Property Office, Search Report and Written Opinion, dated Nov. 9, 2020, 7 total pages.

*Primary Examiner* — Matthew J Daniels
*Assistant Examiner* — Andrew D Graham
(74) *Attorney, Agent, or Firm* — SoCal IP Law Group LLP; Mark A. Goldstein; Angelo J. Gaz

(57) ABSTRACT

A process for producing a photochromic eyewear lens. In one embodiment at least a layer of modified photochromic poly(urea-urethane) is formed by combining photochromic material and the reaction product of a polyurethane pre-polymer and a mixture of diethyltoluene diamine and one or more polyols, plus catalyst. The mixture comprises both $NH_2$ and OH reactive groups, with at least 0.04 equivalent weights of OH reactive species available for reaction with each 1.0 equivalent weight of excess NCO reactive species available in the pre-polymer. The lens comprising the modified photochromic poly(urea-urethane) can exhibit faster fade-back rates and better photochromic performance than lenses with non-modified poly(urea-urethane).

18 Claims, 2 Drawing Sheets

(51) Int. Cl.
*C08K 5/1545* (2006.01)
*C08G 18/10* (2006.01)
*C08G 18/75* (2006.01)
*G02C 7/10* (2006.01)
*C08G 18/32* (2006.01)
*C08G 18/44* (2006.01)
*C08G 18/66* (2006.01)
*C09D 175/04* (2006.01)
*B29K 75/00* (2006.01)

(52) U.S. Cl.
CPC ........ *G02C 7/102* (2013.01); *B29D 11/00442* (2013.01); *B29K 2075/02* (2013.01); *B29K 2995/0018* (2013.01); *C09K 2211/1018* (2013.01); *G02C 2202/16* (2013.01)

(56) References Cited

U.S. PATENT DOCUMENTS

| | | | | |
|---|---|---|---|---|
| 3,833,289 | A * | 9/1974 | Schuler | G02B 1/041 359/487.02 |
| 3,881,683 | A * | 5/1975 | Whitney | B29C 33/0038 249/117 |
| 4,364,786 | A * | 12/1982 | Smith, Jr. | B32B 17/10018 156/99 |
| 4,679,918 | A * | 7/1987 | Ace | G02C 7/02 351/159.62 |
| 4,824,882 | A * | 4/1989 | Nakamura | G02B 5/3033 524/89 |
| 4,889,413 | A | 12/1989 | Ormsby et al. | |
| 4,968,454 | A | 11/1990 | Crano et al. | |
| 5,130,353 | A * | 7/1992 | Fischer | C09D 101/284 524/43 |
| 5,185,390 | A * | 2/1993 | Fischer | C09D 101/284 524/43 |
| 5,405,557 | A * | 4/1995 | Kingsbury | B29C 45/16 264/1.7 |
| 5,523,030 | A | 6/1996 | Kingsbury | |
| 5,531,940 | A * | 7/1996 | Gupta | B29D 11/0073 252/586 |
| 5,645,767 | A * | 7/1997 | Van Gemert | G02B 5/23 252/586 |
| 5,668,239 | A | 9/1997 | Nodelman et al. | |
| 5,702,813 | A * | 12/1997 | Murata | B32B 27/36 428/332 |
| 5,800,744 | A * | 9/1998 | Munakata | B29C 45/0013 156/99 |
| 5,830,578 | A * | 11/1998 | Ono | G02B 1/14 428/446 |
| 5,914,193 | A * | 6/1999 | Ono | B29D 11/00 427/164 |
| 5,962,617 | A * | 10/1999 | Slagel | C08G 18/10 528/61 |
| 5,962,619 | A | 10/1999 | Seneker et al. | |
| 5,991,072 | A * | 11/1999 | Solyntjes | G02B 5/208 2/8.7 |
| 6,068,797 | A * | 5/2000 | Hunt | B29C 37/0032 264/1.7 |
| 6,107,395 | A * | 8/2000 | Rosthauser | C08G 18/10 524/589 |
| 6,113,811 | A * | 9/2000 | Kausch | C08J 5/18 252/585 |
| 6,127,505 | A * | 10/2000 | Slagel | C08G 18/7642 528/61 |
| 6,187,444 | B1 | 2/2001 | Bowles et al. | |
| 6,367,930 | B1 * | 4/2002 | Santelices | G02B 5/23 351/159.61 |
| 6,531,076 | B2 | 3/2003 | Crano et al. | |
| 6,733,887 | B2 | 5/2004 | Okoroafor et al. | |
| 6,734,272 | B2 | 5/2004 | Tamura et al. | |
| 7,002,744 | B2 * | 2/2006 | Evans | B29C 33/0061 264/1.31 |
| 7,144,969 | B2 | 12/2006 | McDonald | |
| 7,189,456 | B2 * | 3/2007 | King | B32B 27/00 428/412 |
| 7,662,433 | B2 | 2/2010 | Ford et al. | |
| 7,695,653 | B2 * | 4/2010 | Hsu | G02B 1/08 264/2.7 |
| 7,771,782 | B2 * | 8/2010 | Baiocchi | B29D 11/0073 427/163.1 |
| 8,029,707 | B2 * | 10/2011 | Berzon | G02B 5/23 264/2.2 |
| 8,349,986 | B2 | 1/2013 | Rukavina et al. | |
| 8,582,192 | B2 * | 11/2013 | Kumar | G02F 1/1335 359/241 |
| 9,081,130 | B1 * | 7/2015 | Fan | G02C 7/102 |
| 9,316,765 | B2 | 4/2016 | Mori et al. | |
| 9,440,419 | B2 | 9/2016 | Vu et al. | |
| 9,733,488 | B2 * | 8/2017 | Ambler | G02C 7/022 |
| 2001/0050356 | A1 * | 12/2001 | Crano | C08K 5/0091 252/582 |
| 2003/0044620 | A1 * | 3/2003 | Okoroafor | G02B 5/23 428/423.5 |
| 2004/0012002 | A1 * | 1/2004 | Vassal | C08G 18/6659 252/586 |
| 2004/0021133 | A1 * | 2/2004 | Nagpal | C08F 2/44 252/500 |
| 2004/0096666 | A1 * | 5/2004 | Knox | C08G 18/6674 428/412 |
| 2004/0126587 | A1 * | 7/2004 | Maki | B29D 11/0073 428/412 |
| 2005/0089630 | A1 * | 4/2005 | Schlunt | G02B 5/23 427/162 |
| 2005/0233153 | A1 * | 10/2005 | Qin | B32B 23/00 428/423.1 |
| 2007/0187656 | A1 * | 8/2007 | Evans | C08G 64/183 252/582 |
| 2007/0278461 | A1 * | 12/2007 | Petrovskaia | C07F 7/1804 252/586 |
| 2008/0067701 | A1 * | 3/2008 | Ford | B29D 11/00865 264/1.1 |
| 2008/0071016 | A1 | 3/2008 | Boettcher et al. | |
| 2008/0103301 | A1 * | 5/2008 | Chopra | C07D 413/10 544/150 |
| 2008/0225400 | A1 * | 9/2008 | Swarup | C09K 9/02 359/642 |
| 2009/0093601 | A1 * | 4/2009 | Evans | C08F 220/18 526/204 |
| 2010/0010192 | A1 * | 1/2010 | Kawaguchi | C08G 18/3876 528/374 |
| 2010/0232003 | A1 * | 9/2010 | Baldy | G02C 7/12 359/243 |
| 2011/0042629 | A1 * | 2/2011 | Chopra | C07D 311/78 252/586 |
| 2011/0058142 | A1 * | 3/2011 | Berit-Debat | C09D 183/04 351/159.57 |
| 2011/0108781 | A1 * | 5/2011 | Tomasulo | G03C 1/73 252/586 |
| 2011/0129678 | A1 * | 6/2011 | He | G03C 1/73 428/423.1 |
| 2011/0143141 | A1 * | 6/2011 | He | C07D 311/94 428/412 |
| 2011/0217544 | A1 * | 9/2011 | Young | B29C 37/0032 428/327 |
| 2012/0019888 | A1 * | 1/2012 | Mori | G02B 1/041 359/241 |
| 2013/0329184 | A1 * | 12/2013 | Barzak | G02C 7/12 351/159.56 |
| 2014/0272426 | A1 * | 9/2014 | Vu | B32B 27/08 428/423.3 |
| 2015/0301227 | A1 * | 10/2015 | Ryu | G02B 1/041 351/159.61 |
| 2016/0167299 | A1 * | 6/2016 | Jallouli | G02B 1/041 351/159.73 |
| 2016/0222285 | A1 | 8/2016 | Shimizu et al. | |
| 2016/0231594 | A1 * | 8/2016 | Ang | G02B 1/115 |
| 2016/0313575 | A1 * | 10/2016 | Kakinuma | C08G 18/722 |

(56) References Cited

U.S. PATENT DOCUMENTS

2018/0210330 A1* 7/2018 Tomasulo .............. G03C 1/733
2018/0251675 A1* 9/2018 Niemi ................ C08G 18/6685

* cited by examiner

OPTICAL ARTICLES COMPRISING PHOTOCHROMIC POLY(UREA-URETHANE)

CROSS-REFERENCE TO RELATED APPLICATIONS

This application claims the benefit of U.S. Provisional Application No. 62/465,639 filed on Mar. 1, 2017 and which is hereby incorporated by reference in its entirety.

FEDERALLY SPONSORED RESEARCH OR DEVELOPMENT

Not applicable.

JOINT RESEARCH AGREEMENT

Not applicable.

SEQUENCE LISTING

Not applicable.

PRIOR USE

Not applicable.

FIELD OF THE INVENTION

The field of the invention relates generally to eyewear and more specifically to eyewear lenses with photochromic response.

BACKGROUND

Eyewear is commonly used to correct vision errors, aberrations and focusing deficiencies caused by age, disease or other factors. In addition to correcting physiological vision problems, eyewear may also be used to ameliorate physical or environmental conditions (such as glare, variable lighting, high intensity light, dust, condensation, etc.) that can affect sight.

Variable lighting conditions can interfere with proper vision and acuity. When subjected to sudden or drastic changes in illumination, the effects can range from minor inconvenience to disabling and dangerous loss of perception. The eye requires a measureable amount of time to adjust to both lighter or darker conditions, and it is common (albeit extremely uncomfortable) to have a feeling of momentary blindness during these transitional periods.

Most people are familiar with the benefit of sunglasses in moderating such discomfort in bright daylight conditions. Static tinted lenses cut down on the intensity of light, and certain colors of lenses may preferentially block or absorb specific wavelength regions to further assist with depth perception or contrast enhancement. In addition, polarized sunglasses are particularly effective at blocking blinding glare and easing eyestrain. Photochromic lenses, which respond to changes in light intensity, are another approach.

The organic photochromic agents in common use for photochromic eyeglass lenses have labile structures that change their molecular orientation by bond breaking, electron transfer and/or rotation in response to absorption of radiant energy. These re-orientations are typically reversible when the source of energy is removed. Thus, the photochromic materials are chosen to darken in the presence of bright light, and then clear as the light intensity decreases. However, there may be some limitations to this responsiveness. Many photochromics absorb ultraviolet light and therefore may have limited response behind a window, such as when driving a car, or riding in a train. Recent advances in photochromic technologies have extended absorption (activation) into the visible wavelength region for improved responsiveness. Another limitation can be how quickly the photochromic molecules respond to changes in absorbed energy; it would be clearly unacceptable (and possibly dangerous) if it took half an hour for a lens to lighten when one walked inside from a bright sunlit area. Faster fade-back time is an important factor in rating the performance of photochromic lenses.

As a practical matter, it has been found that the physical environment of the photochromic molecule may significantly affect the responsiveness and the lifetime of its performance. Since the color change (lightening and darkening) of the photochromic organic molecules is dependent on physical rearrangement and movement of the molecule, a certain amount of unhindered space is preferable for the photochromic organic molecules to undergo the physical rearrangement and movement. In the gas or liquid phase, or in solution, this is not an issue, but when trapped within a solid matrix (within an eyewear lens, or applied onto a lens), many limitations can appear. In addition, the photochromic molecules can "fatigue" (i.e., lessen in coloration or response) due to exposure to environmental conditions or repeated movement of the physical bonds.

Many processes to apply or incorporate photochromics to optical materials have already been advanced, as described for instance in U.S. Pat. Nos. 4,968,454, 5,405,557 and 5,523,030, and references therein. Similarly, significant development has been invested to improve optical lens materials with properties such as improved impact resistance, improved chemical resistance, high refractive index, low chromatic aberration, light weight, or other beneficial features—in addition to ease of incorporation of photochromic agents. It is often the case that improvement in one area is accompanied by poorer performance in another property. One can then decide a balance of attributes that may be effective and most beneficial for the optical lens wearer.

There has been much interest in polyurethane materials as a medium for photochromic molecules. These materials, formed by the reaction of polyisocyanate and polyols, have been found to be good host materials for the organic photochromics. The polyurethanes are softer (and in some cases, elastomeric) materials that do not have sufficient rigidity or structural integrity to serve as primary lens materials, but can be used as coatings, adhesives, interlayers, or embedded layers, or as elements within thin laminates that are joined to or contained within a lens. Examples of polyurethane photochromic coatings used for lenses are described in U.S. Pat. Nos. 4,889,413; 6,187,444 B1 and 7,662,433 B2. Photochromic polyurethanes that are used as adhesives, thin interlayers or films in laminates and are incorporated in or on optical lenses are described, for instance, in U.S. Pat. Nos. 4,889,413; 6,107,395 and 9,440,419 B2.

Another approach has been to explore poly(urea-urethanes), which may be designed with much higher impact strength than many of the soft or elastomeric polyurethanes. As described, for example, in U.S. Pat. Nos. 5,962,617; 5,962,619; 6,127,505; 6,531,076 B2; 6,733,887 B2; 6,734,272 B2; 7,002,744 B2; 7,144,969 B2 and 9,316,765 B2, poly(urea-urethanes) are often formed by reacting compounds containing isocyanate groups with polyols or other OH-containing materials to form a pre-polymer with excess reactive NCO groups, and then reacting this polyurethane pre-polymer with polyamines to form a final poly(urea-urethane). These materials often have improved impact resistance and can be designed with good optical clarity and high transmittance to allow use as lens substrates and/or as viable structural layers in ophthalmic-quality eyewear lenses. Photochromic materials can also be added into the reaction mixtures, imbibed, or applied to the final lens product to impart photochromic properties.

However, in the development of new optical materials, and particularly those used for photochromic eyewear lenses or spectacle lenses, there is a constant challenge to provide a material that will allow sufficient open space within its structure to accommodate the required molecular rotation or rearrangement of the photochromic molecules, while still maintaining the strength, rigidity and structural resilience needed for a reliable and long-lasting eyewear lens. In addition, there is continued market demand for faster photochromic response and better range of transmittance change for the lens (lighter in the rest state, and darker when exposed to activating energy). It has been difficult to achieve both "darker and faster" in the same product, especially if increased speed of fade-back is desired. Increased fade-back rate can be particularly beneficial for older persons due to the slower active response of the eye, for highly light-sensitive individuals, and for those passing frequently between regions of different light intensity (such as driving through multiple tunnels, or passing through open forested areas).

Further improvements in photochromic performance, as well as improved optical materials, continue to be areas of research. The present invention provides a new approach to address both these fields.

BRIEF SUMMARY

In one embodiment, the invention is directed to a process for producing a photochromic eyewear lens. The process comprises forming at least one layer of modified photochromic poly(urea-urethane) by combining at least one photochromic material, and the reaction product of a polyurethane pre-polymer, a mixture of diethyltoluene diamine and one or more polyols, and one or more catalysts provided in a total weight percent of about 0.05% to about 1.1% of the total weight of the mixture. The polyurethane pre-polymer for this reaction is prepared by the reaction of cycloaliphatic diisocyanate and at least one polyol in an equivalent weight ratio of about 2.5 to 4.0 NCO reactive groups/1.0 OH reactive groups, such that the resultant polyurethane pre-polymer has excess NCO reactive groups. The polyols in the mixture of diethyltoluene diamine and one or more polyols each have molecular weights less than 1200. Additionally, the mixture provides OH and $NH_2$ reactive groups and the combined equivalent weight of OH and $NH_2$ reactive groups in the mixture is in the range of about 0.75 to about 1.10, for each 1.0 equivalent weight of excess NCO reactive groups in the polyurethane pre-polymer.

In one embodiment of the invention, the equivalent weight of OH reactive groups in the mixture is at least 0.04 for each 1.0 equivalent weight of excess NCO reactive groups in the polyurethane pre-polymer. In another embodiment, the equivalent weight of OH reactive groups in the mixture is at least 0.08 for each 1.0 equivalent weight of excess NCO reactive groups in the polyurethane pre-polymer. In another embodiment, the equivalent weight of OH reactive groups in the mixture is at least 0.20 for each 1.0 equivalent weight of excess NCO reactive groups in the polyurethane pre-polymer.

In an embodiment of the invention, the combined equivalent weight of OH and $NH_2$ reactive groups in the mixture does not exceed 0.95 for each 1.0 equivalent weight of excess NCO reactive groups of the polyurethane pre-polymer.

In another embodiment of the invention, the equivalent weight of $NH_2$ reactive groups in the mixture is less than 0.745 for each 1.0 equivalent weight of excess NCO reactive groups in the polyurethane pre-polymer.

In an embodiment of the invention, the one or more catalysts are added to the mixture before reacting the mixture and the polyurethane pre-polymer. In another embodiment of the invention, one or more catalysts can be an organometallic compound or a tertiary amine. In another embodiment, the organometallic compound that is used as one or more of the catalysts is selected from the group of organometallic tin compounds, organometallic zinc compounds, organometallic zirconium compounds and mixtures thereof.

In embodiments of the invention, the process comprises forming at least one layer of modified photochromic poly(urea-urethane) on a lens element comprising one or more lens material. Lens materials can include thermoplastic polycarbonate, hard resin thermoset polymers, poly(urea-urethanes), polythiourethanes, epi sulfides, other sulfur-containing polymers with refractive indices higher than about 1.56, polystyrenes, polyamides, optical-grade nylon polymers, acrylics, polyacrylates, and polymethacrylates. In another embodiment, one or more coatings can be applied to at least one of the modified photochromic poly(urea-urethane) layer and the lens element. The one or more coatings can be chosen from hard coatings, hydrophobic coatings, anti-fog coatings, moisture-barrier coatings, mirror coatings, visible light anti-reflective coatings, ultraviolet light anti-reflective coatings, electrochromic coatings, polarizing coatings, polarizing multilayer thin film coatings, multilayer interference coatings, conductive coatings, visible light-filtering coatings, ultraviolet light-filtering coatings and infrared light-filtering coatings.

In an embodiment of the invention, the layer of modified photochromic poly(urea-urethane) on the lens element has at least a 10% faster fade-back rate as measured as transmittance at 555 nm when the photochromic material is activated. This faster fade-back rate is in comparison to a lens element with a poly(urea-urethane) layer comprising the same photochromic material and the reaction product of the same polyurethane pre-polymer reacted only with diethyltoluene diamine instead of the mixture and catalyst. In another embodiment, the visible luminous transmittance of the layer of modified photochromic poly(urea-urethane) on the lens element is less than 15% but greater than 8% when the photochromic lens is activated.

In another embodiment of the invention, the modified photochromic poly(urea-urethane) layer further comprises one or more additives such as mold release agents, thermal or light stabilizers, UV absorbers, dyes or tints, pigments, antioxidants, chain extenders, color blockers, optical brighteners, surfactants, plasticizers, and inert impact modifiers.

In an embodiment of the invention, the photochromic material can consists of silver halides, dichroic metal oxides, dichroic organic dyes, thermochromics, spiro(indoline) pyrans, naphthopyrans, benzopyrans, dithizonates, benzoxazines, spiro-oxazines, spiro(indoline)naphthoxazines, spiro-pyridobenzoxazines, anthroquinones, oxazines, indolizines, fulgides, or fulgimides. In an embodiment of the invention, the process of forming layer of modified photochromic poly(urea-urethane) comprises at least two photochromic materials, and at least one of the photochromic materials is activated by visible light. In one embodiment of the invention, the photochromic material(s) can be mixed into the polyurethane pre-polymer. In another embodiment, photochromic material(s) can be combined with the reaction product by contacting the reaction product with the photochromic material, and imbibing the photochromic material into the reaction product.

Another embodiment of the invention is the photochromic eyewear product comprising the photochromic eyewear lens produced by the process.

DETAILED DESCRIPTION OF EXEMPLARY EMBODIMENTS OF THE INVENTION

Figure 1:
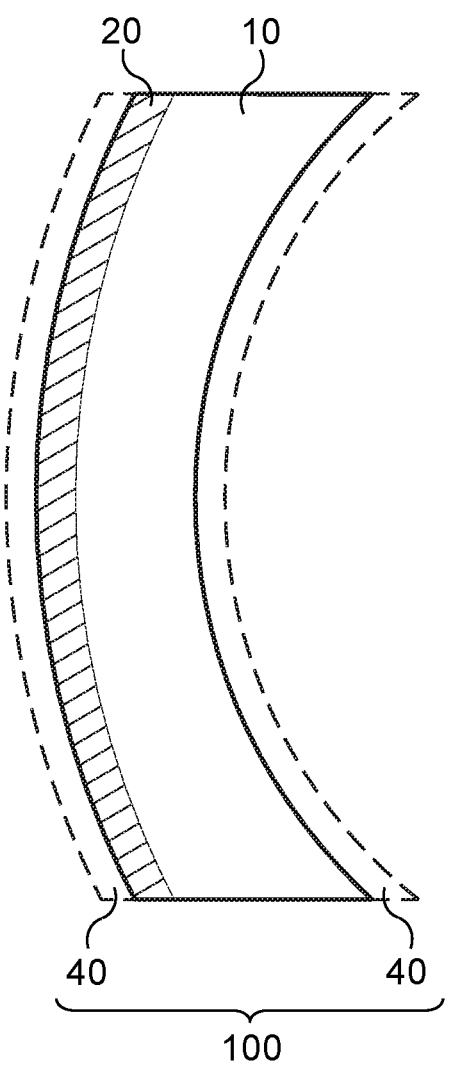
FIG. 1 shows an exemplary side view of an embodiment of an eyewear lens of the invention.

The inventors achieved unexpected and significant improvements in the photochromic performance of optical articles, and particularly eyewear lenses, by further modification of the reaction processes that form photochromic poly(urea-urethanes) used in these articles. When the polyurethane pre-polymer was reacted with significant amounts of polyols in addition to polyamine reactants to form the modified photochromic poly(urea-urethane), the fade-back rate was markedly shortened, and surprisingly, the darkest state of the lens (the lowest transmittance achieved) was not compromised. In fact, this improved material enabled more activity of the photochromics, so that even lower transmittance values were achieved for the optical articles made via embodiments of the invention.

In one embodiment of the invention, an optical article is provided. The optical article comprises at least a component formed of the modified photochromic poly(urea-urethane). The optical articles described herein can be designed to transmit at least some light visible to the eye. In one embodiment, the optical article is an eyewear lens comprising at least a layer of the modified photochromic poly(urea-urethane) on at least one optical surface of the lens. In one aspect of this embodiment, the eyewear is provided external to the eye and not in direct contact with the eye. Eyewear lenses are optical articles worn in front of the eye. They may be plano, prescription or non-prescription lenses. Ophthalmic-quality eyewear lens products are lenses and lens blanks with sufficient structural integrity that they maintain the specified optical power of the finished eyewear lens, whether that specified power is zero (plano), plus, minus or multifocal. The specified optical power may be defined by an individual's prescription for correction of vision, or may be established according to industry or ophthalmic national and international standards for prescription and non-prescription lens products. Depending on the needs and desires of the individual, they may serve one or more purposes: correct vision, provide protection or improved comfort for the eyes, or be a fashionable accessory. Eyewear lenses are commonly mounted in eyeglass frames, rims, mountings, goggles, helmets, carriers, visors or other structures designed to hold lenses in front of the user's eyes. Eyewear lenses, as used herein, include lens blanks, semi-finished lens blanks, finished lens blanks, surfaced lenses, edged lenses and mounted lenses.

Many different optical materials can be used to form eyewear lenses. It is preferred for such materials to exhibit low intrinsic haze or scatter, and to have sufficient chemical, physical and mechanical integrity to endure long term wear and maintain the prescribed optical power. Among the materials known in the art are both inorganic and organic optical materials, such as metal oxide glasses with various refractive indices; optical-grade thermoplastics such as polycarbonates and other materials; hard resin thermoset polymers [based on polyol(allyl carbonate) polymerization, and particularly on reactions of diethylene glycol bis(allyl carbonate)], poly(urea-urethanes); polyurethanes; polythiourethanes; epi sulfides; other sulfur-containing polymers with refractive indices higher than about 1.56; polystyrenes; polyamides; certain enhanced optical-grade nylon polymers; acrylics; polyacrylates; polymethacrylates and other organic polymers. The optical materials can also comprise mixed organic and/or inorganic materials of crystalline, amorphous or polymeric structures, and can contain other additives to modify the materials' optical, physical or chemical properties.

Eyewear lens products can also comprise combinations of optical materials as layered structures and composites. In an embodiment of the invention, the modified photochromic poly(urea-urethane) can be used in such combinations. In one embodiment, as shown in FIG. 1, the modified photochromic poly(urea-urethane) can be formed as a layer 20 that is closer to the outer surface of the eyewear lens 100 when it is mounted in front of the eye (that is, the layer is farther from the wearer's eye when the eyewear lens is in use). In this exemplary embodiment, element 10 is a layer or structure that comprises optical material positioned closer to the eye when the eyewear lens is in use. Element 10 can comprise one or more optical materials and can also comprise substances, treatments, layers, coatings, additives and/or components, as further described herein. In one embodiment, eyewear lens 100 is an ophthalmic-quality eyewear lens.

While FIG. 1 shows an exemplary embodiment, it is understood that within the scope of the invention, the layer of modified photochromic poly(urea-urethane) can be placed on an inner surface of the optical article. It is also within the scope of the invention to position the layer of modified photochromic poly(urea-urethane) within the construct of the optical article by sandwiching, laminating, adhering, bonding, fusing, joining or mounting the layer in, on or against one or more other elements of the article. The layer of modified photochromic poly(urea-urethane) can also extend over less than the entire diameter of the eyewear lens.

While optical quality may be an important requirement for optical articles and eyewear lenses, these products may not transmit 100% of all visible light. This is due to the physical laws of refractive index differences and resultant reflection at surfaces, and to inherent or designed absorptance or reflectance of the lens materials or the lens construction. In fact, it may be highly desirable to have the eyewear lenses limit transmittance of some visible light, as well as some light in other wavelength regions. For example, in certain embodiments, the eyewear lenses can attenuate or block a significant amount of UV light in the 315 nm to 380 nm wavelength region. This can be accomplished by intrinsic absorption properties of the lens material(s), or result from additives or treatments combined with the lens or lens material(s). As examples, UV absorbers can be added to element 10 and/or layer 20; added with one or more reactants that form the element 10 or layer 20; or can be included in optional layers of the eyewear lenses. In another example, coatings, films and other added elements of the optical article or eyewear lens can include one or more UV reflectors or absorbers.

In certain embodiments, the lens material(s), element 10, layer 20, or other elements of the eyewear lens can further comprise one or more additives. The additives can include substances that modify the polymeric structure of a lens material or element, or alter its physical, optical or chemical properties for better performance as an ophthalmic lens. Additives can also be included to increase the stability of a particular material's properties, or to tailor them to a specific optical or physical performance. Preferred additives include substances such as electrochromics, thermochromics, nanoparticles, liquid crystals, dyes, tints, pigments, UV absorbers, UV reflectors, UV stabilizers, thermal stabilizers, IR reflectors, visible light filters, selective light reflectors, and selective light absorbers and the like.

In another embodiment, the optical article, and particularly the eyewear lens, can comprise additional optional elements, as indicated by 40 in FIG. 1. These optional elements can be added to either or both element 10 or layer 20, or to one or more locations of the lens 100. One or more of such added elements can comprise materials, substances, treatments, layers or coatings that tailor specific optical, chemical or physical performance. These added elements can also comprise one or more of the additives mentioned previously. In addition, optional elements(s) 40 can comprise or include polarizers, displays, cameras, sensors, transmitters, receivers, electrical contacts, wireless devices, marks and decorations. If multiple optional elements 40 are added to lens 100, each such element can comprise the same or different materials, substances, treatments, layers, coatings, additives and/or components.

The eyewear lens 100 can further comprise components that enhance appearance, or modify the performance or functionality of the product for particular eyewear lens use. These components can be included in or on element 10, layer 20 or can be separate elements from these features. In one embodiment, the optical article can comprise a polarizer component, which can be embodied as a film, wafer, supported film, coating, multilayer thin film coatings, multilayer polymeric film stack, wire grid, or an applied or embedded structure. Preferred polarizers are selected from linear, gradient linear, elliptical, circular or variable polarizers, and can comprise solid, mixed, multiple or gradient tints. In another embodiment, the eyewear lens can comprise optional components such as displays, cameras, sensors, transmitters, receivers, electrical contacts, circuitry, wireless devices, marks and decorations.

The optional element(s) 40 of eyewear lens 100 can also comprise optional applied coatings such as hard coatings, hydrophobic coatings, anti-fog coatings, moisture-barrier coatings, mirror coatings, visible light anti-reflective coatings, UV anti-reflective coatings, photochromic coatings, electrochromic coatings, polarizing coatings, polarizing multilayer thin film coatings, multilayer interference coatings, conductive coatings, other visible, UV or infrared light-filtering coatings and other coatings to tailor the optical, chemical or mechanical properties of the lens. Coatings can comprise one or more layers; for instance, multilayer interference coatings of dielectric, metal/dielectric or conductive/insulating materials can range from two to several hundreds of layers. In addition, one or more types of coatings may be used in combination with the eyewear lens.

The optional element(s) 40 of eyewear lens 100, element 10 and/or layer 20 can also comprise optional treatments to change the surface properties of the lens or the respective layer or element. Some preferred optional treatments can act as moisture barriers or release agents, or can improve anti-fogging or ease of cleaning. Other preferred optional treatments can increase resistance to scratches, impact, or chemicals; or enhance adhesion of subsequent coatings, layers, or materials.

While the modified photochromic poly(urea-urethane) material can be used to form the entire optical article, in one embodiment of the invention, the modified photochromic poly(urea-urethane) is used to form only a relatively thin layer in or on the optical article and, particularly, the eyewear lens. Several advantages can be obtained from this approach. First, photochromic substances are very expensive. Second, when the photochromic molecules are activated by exposure to light energy, they may darken, and therefore mask photochromic molecules deeper in the structure from reacting; again, this can be wasteful of materials and limited funds. On the other hand, if there is sufficient penetration of activating energy into a thicker layer and that layer is not uniform, then non-uniform darkening can occur, and this gives an undesirable, blotchy appearance to the lens. In addition, when only a relatively thin layer of modified photochromic poly(urea-urethane) material is incorporated into the eyewear lens 100, the inventors found that it can be combined advantageously with other optical materials, such as element 10, to enhance the overall properties of the optical article.

For convenience, the modified photochromic poly(urea-urethane) material will be referred to as layer 20, with the understanding that this layer of modified photochromic poly(urea-urethane) material can be positioned at or close to the outer surface, at or close to the inner surface or intermediate within the structure of the eyewear lens or optical article made in accord with various embodiments of the invention. One embodiment, as shown in FIG. 1, positions layer 20 toward the outer surface of eyewear lens 100 when it is in use (worn before the eye). This may be preferable for better exposure of the photochromic substance(s) to activating sunlight. In another embodiment, one or more optional element(s) 40 can be added to this layer 20 in a position farther away from the eye. Such optional elements 40 can include, as examples, hard coatings, anti-reflective coatings, UV or IR absorbers, or UV or IR reflectors.

The modified photochromic poly(urea-urethane) material comprises at least one photochromic material. Preferred photochromic materials can include inorganic materials such as silver halides and dichroic metal oxides, as well as organic materials including some dichroic organic dyes, thermochromics (particularly metallo-organic thermochromics), and many different aromatic, hetero-aromatic and ring compounds such as spiro(indoline)pyrans, naphthopyrans, benzopyrans, dithizonates, benzoxazines, spirooxazines, spiro(indoline)naphthoxazines, spiro-pyridobenzoxazines, anthroquinones, oxazines, indolizines, fulgides, fulgimides and other photochromic materials known in the art. In one embodiment, naphthopyran photochromic materials can be used. One or more different types of photochromic materials or different families of photochromics can be combined for use in the modified photochromic poly(urea-urethane) material.

In one embodiment, one or more photochromic materials can be combined such that the eyewear lens exhibits a neutral grey color when the photochromics are activated. In another embodiment, the lens can comprise one or more photochromic materials that provide an identifiable color other than grey when activated. In another embodiment, the eyewear lens can comprise one or more photochromic materials that provide a light tint to the eyewear in the rest (unactivated) state, but a darker tint when activated by visible and/or UV light.

In another embodiment, the eyewear lens can change its color hue under different lighting intensities or wavelengths of exposure.

In one embodiment, the modified photochromic poly(urea-urethane) material can be advantageously designed to make use of the one or more photochromics that are activated by different wavelength regions (such as UV exposure, near UV exposure, near-visible light exposure or blue light exposure) to change either or both color hue and depth of tint. Most commercially available photochromic materials are only activated by UV light, but a few photochromic materials can either absorb and react under visible light, or have an absorption tail that extends into the visible range (near the blue light edge) so that they have some limited response to visible light. Photochromic materials with visible light activation can provide additional UV or blue light filtering by the eyewear lens. By use or combination of photochromic materials that are activated by different light frequencies, the inventors can advantageously tailor the eyewear lens to respond to direct sunlight, various artificial light sources, or to light filtered through windows or windscreens.

Some of the previous methods and chemistries for preparing impact-resistant poly(urea-urethanes) for optical parts can be used as starting points for the preparation of the modified photochromic poly(urea-urethane). The poly(urea-urethanes) described previously are commonly formed by reacting an "A-side" polyurethane pre-polymer containing active isocyanate groups, with a "B-side" comprising polyamine compound(s) in an equivalent weight ratio such that most of the excess NCO reactive groups of the A-side are consumed in reaction with the amine groups of the B-side to form the final poly(urea-urethane) product. The equivalent weight ratios for the NCO:OH reaction to form the polyurethane pre-polymer of the A-side may be in the range of about 2:1 to about 4.5:1. The equivalent weight ratios of reactive amine:excess reactive NCO for the reaction of the B-side with the A-side may be in the range of about 0.85:1 to about 1.1:1. Methods and reaction mixtures for creating impact-resistant poly(urea-urethanes) suitable for optical articles are discussed in detail, for example, in U.S. Pat. No. 6,127,505 and references therein; U.S. Pat. Nos. 7,002,744 B2; 6,531,076 B2 and 6,733,887 B2, which are each incorporated herein by reference. U.S. Pat. Nos. 6,531,076 B2 and 6,733,887 B2 further describe admixing photochromic materials with the polyamine and the prepolymer to form a photochromic poly(urea-urethane).

The inventors determined that an improved and modified poly(urea-urethane) can be obtained by substituting additional polyol(s) for a portion of the polyamine on the "B-side" of the reaction of the poly(urea-urethane) materials of the types described in U.S. Pat. Nos. 6,127,505; 7,002,744 B2; 6,531,076 B2 and 6,733,887 B2. This is distinct from previous quasi-prepolymer methods, in which less polyol is added to the A-side, and the remainder of polyol (to reach the same NCO:OH equivalent weight ratio desired for the A-side) is added to the B-side. In an embodiment of the invention, the overall percentage of polyol in the reaction mixture is significantly increased as compared to previous poly(urea-urethanes).

Impact resistant poly(urea-urethanes) for optical parts made according to some of these previous disclosures can be made by combining, for example, Trivex® A-side and B-side materials commercially available from PPG Industries, Inc. For convenience, the inventors used these materials, or similar A-side and B-side mixtures as starting materials for their modified photochromic poly(urea-urethanes).

In addition, the A-side can comprise other additives, such as mold release agents, thermal or light stabilizers, UV absorbers, dyes or tints, pigments, antioxidants, chain extenders, color blockers, optical brighteners, surfactants, plasticizers, inert impact modifiers or other materials to improve the optical or physical properties of the final reaction product. Such additives can also be included in the B-side, but due to the reactivity of the polyamine compounds, it can be more effective or beneficial to include these additives in the A-side, or to admix them separately as the reaction occurs between the A-side and B-side.

In an embodiment, photochromic materials were added to the A-side (the polyurethane pre-polymer) of the reactive mixture. Various weight percentages of one or more photochromic materials can be used, and in general, the degree of coloring (darkening) of the resultant optical article increases with the amount of photochromic material(s) added. However, given the high cost of these photochromic materials, and the need for some minimum transmittance through the eyewear lens, it may be preferable to keep the weight percentage as low as possible while still achieving effective darkening. In embodiments of the invention, less than about 5% by weight, less than about 4% by weight, less than about 3.5% by weight, less than about 3%, less than about 2.9% by weight, less than about 2.8% by weight, less than about 2.7% by weight, less than about 2.6% by weight, less than about 2.5% by weight, less than about 2.4% by weight, less than about 2.3% by weight, less than about 2.2% by weight, less than about 2.1% by weight by weight, less than about 2% by weight, less than about 1.9% by weight, less than about 1.8% by weight, less than about 1.7% by weight, less than about 1.6% by weight, less than about 1.5% by weight, less than about 1.4% by weight, less than about 1.3% by weight, less than about 1.2% by weight, less than about 1.1% by weight, less than about 1% by weight, less than about 0.9% by weight, less than about 0.8% by weight, less than about 0.7% by weight, less than about 0.6% by weight, less than about 0.5% by weight, less than about 0.4% by weight, less than about 0.3% by weight, or less than about 0.25% by weight of photochromic materials are used. In another embodiment, the amount of photochromic materials included is between and includes any two of the foregoing values. In an aspect of this embodiment, the amount of photochromic materials included can be less than about 2% but more than about 0.25% by weight; in another aspect of this embodiment, less than about 1.8% but more than about 0.3% photochromic materials are included by weight; in another aspect of this embodiment less than about 1.6% but greater than about 0.5% by weight of photochromic materials are included.

To create the modified photochromic poly(urea-urethane), the NCO:OH equivalent weight ratio to form the A-side polyurethane pre-polymer was not changed, but additional polyols were added to the B-side of the reaction mixture before the B-side is reacted with the A-side pre-polymer. This will cause a competing reaction of the NH$_2$ and OH species of the B-side with the excess reactive NCO groups of the polyurethane pre-polymer on the A-side. The reaction of isocyanate groups with amine groups is thermodynamically and kinetically favored over the reaction of isocyanates with hydroxyl groups. However, excess unreacted hydroxyl groups can lead to brittle or opaque products. Therefore, one or more catalysts can be added to the B-side as well, to encourage the OH reaction.

Preferred polyols to add to the B-side include polyether, polyester, polycarbonate, polycaprolactone and copolymer polyols. In an embodiment of the invention, the polyols comprise diols that may control the degree of cross-linking; too much cross-linking can hamper photochromic activity in the polymer matrix of layer 20. The polyols that can be used include, without limitation, any one or a combination of aliphatic or cycloaliphatic polyols and aliphatic or cycloaliphatic diols. In one embodiment, the added polyols comprise one or more aliphatic or cycloaliphatic diols.

In embodiments of the invention, the one or more polyols added to the B-side comprise molecular weights of less than about 1200, about 1100, about 1000, about 900, about 800, about 700, about 600, about 500, about 400, about 300, about 200, or about 100. In another embodiment, the one or more polyols may have a molecular weight that is between and includes any two of the foregoing values.

In another embodiment, the one or more polyols comprise one or more diols with molecular weights of less than about 1200, about 1100, about 1000, about 900, about 800, about 700, about 600, about 500, about 400, about 300, about 200, or about 100. In another embodiment, the one or more diols may have a molecular weight that is between and includes any two of the foregoing values. In one embodiment, the added polyols with molecular weights less than 1200 are polyether diols; in another embodiment, the added polyols are polyether diols based on tetrahydrofuran.

The amount of polyols or preferably diols added to the B-side substitute for a portion of the amine equivalent weight ratio of the B-side, such that the equivalent weight ratio of B-side reactants to the A-side NCO excess reactive species remains approximately constant (e.g., B:A ratio is approximately 0.75-1.2:1), but the B-side reactants now comprise a marked amount of hydroxyl groups as well as amine groups. This combination of B-side reactants is in distinction from the reaction pathways and their resultant poly(urea-urethane) products as described in U.S. Pat. Nos. 6,127,505; 7,002,744 B2; 6,531,076 B2 and 6,733,887 B2. In those publications, the B-side reactive species were only amine groups. It was mentioned that some of the reactant polyol used to form the pre-polymer might be added to the B-side, but that did not change the total amount of NH$_2$ reactive species available on the B-side, nor did it change the equivalent weight ratio of B-side reactants to A-side excess NCO reactive groups.

In an embodiment of the invention, the number of reactive species on the B-side available to react with the A-side is in the same range as previously described (e.g., B:A reactive species ratio approximately 0.75:1 to about 1.2:1), but the B-side species that create this ratio specifically include hydroxyl groups instead of only amine groups. In one embodiment, the equivalent weight ratio of B:A reactive species is in the range of about 0.75:1 to about 1.10:1.

Expressed another way, the addition of polyols to the B-side reactants means that, for a given equivalent weight ratio, the B-side reactive species now include both OH and NH$_2$ species. As an example, if the B:A equivalent weight reactive ratio is set to 0.75:1.0, with the previous commercially available materials, this would correspond to 0.75 equivalent weights of NH$_2$ groups on the B-side available to react with 1.0 equivalent weight of excess reactive NCO species on the A-side. In contrast, in this embodiment of the invention, with the same equivalent weight B:A reactive ratio of 0.75:1.0, the B-side equivalent weight ratio will now comprise [x OH groups+(0.75−x) NH$_2$ groups]. For convenience, to indicate that the B-side comprises more than one type of reactive species, and to identify their contributions to the combined equivalent weight of the B-side, the B-side equivalent weight for a reactive ratio will be expressed as:

$$B_{TOT}=B_{OH}+B_{NH2} \quad \text{Equation (1)}$$

wherein $B_{TOT}$ identifies the combined equivalent weight of all OH and NH$_2$ reactive species in the B-side mixture, and $B_{OH}$ and $B_{NH2}$ identify, respectively, the portions of the combined equivalent weight associated with OH and with NH$_2$ reactive species. Therefore, $B_{OH}$ identifies the equivalent weight of OH reactive groups, and $B_{NH2}$ identifies the equivalent weight of NH$_2$ reactive groups in the B-side reactive mixture. For convenience, the equivalent weight reactive ratios of B-side species to A-side reactive species will be expressed in reference to an equivalent weight of 1.0 excess NCO reactive species for the A-side polyurethane pre-polymer.

In embodiments of the invention, the equivalent weight ratio of combined B-side reactive species, $B_{TOT}$, to A-side excess NCO reactive groups can be about 0.75:1.0, about 0.755:1.0, about 0.76:1.0, about 0.77:1.0, about 0.78:1.0, about 0.79:1.0, about 0.80:1.0, about 0.81:1.0, about 0.82:1.0, about 0.825:1.0, about 0.83:1.0, about 0.835:1.0, about 0.84:1.0, about 0.845:1.0, about 0.85:1.0, about 0.855:1.0, about 0.86:1.0, about 0.865:1.0, about 0.87:1.0, about 0.875:1.0, about 0.88:1.0, about 0.89:1.0, about 0.90:1.0, about 0.91:1.0, about 0.92:1.0, about 0.93:1.0, about 0.94:1.0, about 0.95:1.0, about 0.96:1.0, about 0.97:1.0, about 0.98:1.0, about 0.99:1.0, about 0.995:1, about 1.0:1.0, about 1.05:1.0, about 1.10:1.0, about 1.15:1.0, or about 1.20:1.0. In another embodiment, the equivalent weight ratio of B-side combined reactive species to A-side excess NCO reactive groups ($B_{TOT}$:A equivalent weight ratio) can be in a range that is between and includes any two of the foregoing values.

In an embodiment, the polyols added to the B-side replace at least 4% of the reactive species available to react with the excess NCO groups of the A-side. As an illustration, for the example of the previous paragraph with a combined equivalent weight ratio of $B_{TOT}$:A reactants is 0.75:1.0, 4% OH reactive groups on the B-side corresponds to (0.03 equivalent weights of OH+0.72 equivalent weights of NH$_2$)=0.75 equivalent weights of combined B-side reactive species to react with 1.0 equivalent weight of excess NCO on the A-side. In the form of Equation (1), $B_{OH}$=0.03, $B_{NH2}$=0.72, and $B_{TOT}$=0.75. In another embodiment, the polyols added to the B-side replace at least 8% of the B-side reactive species. To illustrate this second example, for the same $B_{TOT}$:A equivalent weight reactive ratio of 0.75:1.0 NCO, the 8% replacement corresponds to (0.06 equivalent weights of OH+0.69 equivalent weights of NH$_2$)=0.75 equivalent weights of combined B-side reactive species to react with 1.0 NCO equivalent weight on the A-side. The 0.75 equivalent weight value of $B_{TOT}$ for the B-side corresponds to $B_{OH}$=0.06 and $B_{NH2}$=0.69.

In another embodiment, the added polyols replace at least 25% of the B-side reactive species available to react with the A-side excess NCO reactive species. As an illustrative example of the invention, if the equivalent weight ratio of $B_{TOT}$:A species was selected as 0.95:1.0, with a 25% replacement of $NH_2$ reactive groups by OH reactive groups, the B-side reactive groups would constitute (0.2375 equivalent weights of of OH groups and 0.7125 equivalent weights of $NH_2$ groups)=0.95 total B-side equivalent weights of reactive species to react with 1.0 equivalent weights of excess NCO on the A-side. With this exemplary 25% replacement at a $B_{TOT}$:A equivalent weight ratio of 0.95:1.0, $B_{OH}$=0.2375 and $B_{NH2}$=0.7125. In another embodiment, the added polyols replace at least 50% of the B-side reactive species available to react with the A-side excess NCO species. Thus, if the equivalent weight ratio of $B_{TOT}$:A reactive species was selected as 1.10:1.0, with a 50% replacement of $NH_2$ reactive groups, the B-side reactive groups would constitute (0.55 equivalent weights of OH groups and 0.55 equivalent weights of $NH_2$ groups)=1.10 total B-side equivalent weights to react with 1.0 NCO equivalent weights on the A-side, with $B_{OH}$=0.55 and $B_{NH2}$=0.55.

In certain embodiments of the invention, for a given $B_{TOT}$:A equivalent weight ratio when the excess NCO reactive species of the A-side polyurethane pre-polymer equivalent weight is expressed as 1.0, $B_{OH}$=x and $B_{NH2}$ = ($B_{TOT}$-x), wherein x is at least 0.02, at least 0.03, 0.04, at least 0.05, at least 0.06, at least 0.07, at least 0.08, at least 0.09, at least 0.10, at least 0.11, at least 00.12, at least 0.125, at least 0.13, at least 0.135, at least 0.14, at least 0.145, at least 0.15, at least 0.155, at least 0.16, at least 0.165, at least 0.17, at least 0.175, at least 0.18, at least 0.185, at least 0.19, at least 0.195, at least 0.20, at least 0.205, at least 0.21, at least 0.22, at least 0.23, at least 0.24, at least 0.25, at least 0.26, at least 0.27, at least 0.28, at least 0.29, at least 0.30, at least 0.31, at least 0.32, at least 0.33, at least 0.34, at least 0.35, at least 0.36, at least 0.37, at least 0.38, at least 0.39, at least 0.40, at least 0.41, at least 0.42, at least 0.43, at least 0.44, at least 0.45, at least 0.46, at least 0.47, at least 0.48, at least 0.49, at least 0.50, at least 0.51, at least 0.52, at least 0.53, at least 0.54, at least 0.55, at least 0.56, at least 0.57, at least 0.58, at least 0.59, at least 0.60, at least 0.61, at least 0.62, at least 0.63, at least 0.65, at least 0.66, at least 0.67, at least 0.68, at least 0.69, at least 0.70, or at least 0.74. In another embodiment, the value of x can be in a range that is between and includes any two of the foregoing values.

Expressing the $B_{OH}$ contribution to $B_{TOT}$ as a percentage of the equivalent weight of $B_{TOT}$, $B_{OH}$ may comprise at least 2%, at least 4%, at least 5%, at least 6%, at least 7%, at least 8%, at least 9% at least 10% at least 11% at least 12% at least 13% at least 14%, at least 15%, at least 16%, at least 17% at least 18%, at least 19% at least 20%, at least 21%, at least 22%, at least 23%, at least 24%, at least 25%, at least 26%, at least 27%, at least 28%, at least 29%, at least 30%, at least 32%, at least 34%, at least 35%, at least 36%, at least 38%, at least 40%, at least 42%, at least 44%, at least 45%, at least 46%, at least 48%, at least 50%, at least 52%, at least 54%, at least 55%, at least 56%, at least 58%, at least 60%, at least 62%, or at least 64% of $B_{TOT}$, when $B_{TOT}$ is expressed in comparison to 1.0 equivalent weights of excess reactive NCO groups for the A-side polyurethane pre-polymer.

Expressed in another way, the polyols added to the B-side contribute a portion to the total mass of the B-side mixture. In one embodiment, the polyols added to the B-side can constitute by mass at least about 10%, at least about 10.5%, at least about 11%, at least about 11.5%, at least about 12%, at least about 12.5%, at least about 13%, at least about 13.5%, at least about 14%, at least about 14.5%, at least about 15%, at least about 15.5%, at least about 16%, at least about 16.5%, at least about 17%, at least about 17.5%, at least about 18%, at least about 18.5%, at least about 19%, at least about 19.5%, at least about 20%, at least about 20.5%, at least about 21%, at least about 21.5%, at least about 22%, at least about 22.5%, at least about 23%, at least about 23.5%, at least about 24%, at least about 24.5%, at least about 25%, at least about 25.5%, at least about 26%, at least about 26.5%, at least about 27%, at least about 27.5%, at least about 28%, at least about 28.5%, at least about 29%, at least about 29.5%, at least about 30%, at least about 30.5%, at least about 31%, at least about 31.5%, at least about 32%, at least about 32.5%, at least about 33%, at least about 33.5%, at least about 34%, at least about 34.5%, at least about 35%, 35.5%, at least about 36%, at least about 36.5%, at least about 37%, at least about 37.5%, at least about 38%, at least about 38.5%, at least about 39%, at least about 39.5%, at least about 40%, at least about 40.5%, at least about 41%, at least about 41.5%, at least about 42%, at least about 42.5%, at least about 43%, at least about 43.5%, at least about 44%, at least about 44.5%, at least about 45%, at least about 45.5%, at least about 46%, at least about 46.5%, at least about 47%, at least about 47.5%, at least about 48%, at least about 48.5%, at least about 49%, at least about 49.5%, at least about 50%, at least about 50.5%, at least about 51%, at least about 51.5%, at least about 52%, at least about 52.5%, at least about 53%, at least about 53.5%, at least about 54%, at least about 54.5%, at least about 55%, 55.5%, at least about 56%, at least about 56.5%, at least about 57%, at least about 57.5%, at least about 58%, at least about 58.5%, at least about 59%, at least about 59.5%, at least about 60%, at least about 60.5%, at least about 61%, at least about 61.5%, at least about 62%, at least about 62.5%, at least about 63%, at least about 63.5%, at least about 64%, at least about 64.5%, at least about 65%, 65.5%, at least about 66%, at least about 66.5%, at least about 67%, at least about 67.5%, at least about 68%, at least about 68.5%, at least about 69 at least about 69.5%, at least about 70%, at least about 70.5%, at least about 71%, at least about 71.5%, at least about 72%, at least about 72.5%, at least about 73%, at least about 73.5%, at least about 74%, at least about 74.5%, at least about 75%, 75.5%, at least about 76%, at least about 76.5%, at least about 77%, at least about 77.5%, at least about 78%, at least about 78.5%, at least about 79%, at least about 79.5%, or at least about −80% of the total mass of the reactive B-side species. In another embodiment, the excess polyols added to the B-side can be in a range that is between and includes any two of the foregoing values. In one aspect of the preferred embodiment, the added polyols can constitute about 25% to about 75% of the total mass of the reactive B-side.

One or more catalysts can be included in the modified reactive mixture of the B-side. The one or more catalysts can be an organometallic compound or a tertiary amine. Exemplary catalysts include organometallic tin, cobalt, bismuth, mercury, zinc or mixed metal complexes. Many different organometallic catalysts, for example from King Industries, Inc. (Norwalk, Conn.), are available commercially. One exemplary mixed metal complex catalyst is K-KAT® XK-604 from King Industries, a proprietary mixture of zinc and zirconium compounds. One exemplary tin catalyst is dibutyltin dilaurate, such as DABCO T-12 available from Evonik Nutrition and Care GmbH (Essen, Germany). Different catalysts can be chosen to accomplish the needed reaction initiation while limiting exposure to unwanted or dangerous chemicals. One or more catalysts can be provided in the reactive mixture of the B-side in a total weight percent of at least about 0.05%, at least about 0.1%, at least about 0.2%, at least about 0.3%, at least about 0.4%, at least about 0.5%, at least about 1%, at least about 1.1%, at least about 1.2%, at least about 1.3%, at least about 1.4%, at least about 1.5%, at least about 1.6%, at least about 1.7%, at least about 1.8%, at least about 1.9%, or at least about 2% by weight. The one or more catalyst can be provided in the reactive mixture of the B-side in a total weight percent that includes and is between any two of the foregoing values. In accordance with one aspect of this embodiment, the one or more catalyst can be provided in a range of about 0.1% to about 1%.

In another embodiment, the one or more catalysts can be added to the reaction when the A-side and the B-side are combined.

When the A-side and B-side are combined, an exothermic reaction will take place. The reaction product may begin to solidify in less than approximately two minutes, but typically the optical articles are cured under controlled temperature conditions for several hours to ensure a known degree of reaction and better retention of chosen optical shapes. A range of cure temperatures and cure times can be used and can be selected based on the degree of cure required for subsequent operations, thermal sensitivity of additives or materials used in the reaction, production efficiency, safety and handling considerations, or other practical factors. Exemplary cure conditions can range from 40° C. for 2-24 hours, to 130° C. for 2-12 hours.

The A-side and B-side reactive mixtures can each be maintained and stored in containers that strictly limit exposure to air or water. Otherwise, the mixtures may yellow, become hazy, or begin to react with moisture in the air.

As described herein, it is preferable (although not required) to use the modified photochromic poly(urea-urethane) as a layer in the optical article rather than the bulk of the article. For eyewear lenses, typical finished lens thicknesses range from about 0.7 mm to about 2-10 mm, depending on such factors as required prescription strength, impact resistance, structural integrity, or other performance or aesthetic considerations. In these instances, layer 20 comprising the modified photochromic poly(urea-urethane) is preferably less than or equal to about 1 mm thick, more preferably between about 0.1-0.7 mm thick, and more preferably between about 0.3-0.7 mm thick. Element 10 (or the combination of element 10 with other optional elements such as element(s) 40) comprises the bulk of the remaining thickness of the eyewear lens.

Layer 20 can be combined with element 10 and other optional elements of the optical article by various methods. For example, element 10 can be a previously formed lens or lens blank. Then, using additive techniques such as those described, for instance, in U.S. Pat. Nos. 5,405,557 or 7,002,744 B2 and references therein, the reactant mixture of the modified photochromic poly(urea-urethane) can be directed onto a surface of element 10 and allowed to solidify under controlled conditions to form layer 20. In this instance element 10 can act as one of the molding surface(s) for layer 20. Another removable mold can act as a second surface to contain and shape layer 20 into the form desired for the optical article.

In an embodiment, element 10 can comprise a single vision, multifocal or progressive lens or lens blank. In further embodiments, element 10 can comprise lens materials such as thermoplastic polycarbonate, hard resin thermoset plastics, high index materials comprising sulfur, poly-thiourethanes, epi sulfides, polystyrenes, polyamides, optical-grade nylon polymers, acrylics, polyacrylates and polymethacrylates, and poly(urea-urethanes) such as those described in U.S. Pat. Nos. 5,962,617; 6,127,505 and 7,002,744 B2 and references therein.

To contain the reactive mixture that will form the modified photochromic poly(urea-urethane) between element 10 and the second molding surface, one may use supports such as gaskets or tape around the edge of the molds. As described in U.S. Pat. No. 7,002,744 B2, a sidefill gasket can be one method to introduce the reactive mixture in a controlled fashion, contain the material between the molds, and maintain proper alignment and spacing between the molding surfaces.

Another method of construction can use gravity or a pressure assist to form the eyewear lens 100. In one exemplary method, a mold is place on a horizontal surface. The reactive mixture that will form the modified photochromic poly(urea-urethane) is dispensed onto the mold's surface, and then element 10 (such as a lens or lens blank) is placed on top of the liquid reactive mixture and presses the mixture between the mold and the surface of element 10 by gravity or by controlled pressure on the back surface of element 10. Alternatively, element 10 can be placed on a horizontal surface, the reactive mixture dispensed onto a surface of element 10 and then a removable mold placed on top of the liquid reactive mixture to press the mixture between the mold and the surface of element 10 by gravity or by controlled pressure on the back surface of the mold.

Other methods of production or combination of element 10 and layer 20 are known in the art, or may be understood from the specification. In another embodiment, the modified photochromic poly(urea-urethane) is created by first producing a lens element, component or layer of modified poly(urea-urethane) without photochromics, and then the respective element, component or layer is contacted with photochromic materials to imbibe, tint, transfer or permeate the photochromics into or onto the modified poly(urea-urethane) to form the final lens element, component or layer of modified photochromic poly(urea-urethane).

The inventors achieved some significant advantages with various embodiments of the invention. Often, if a polymer matrix material is formed that allows fast photochromic response, it is too soft for effective use in an optical article and particularly cannot maintain the demanding requirements for prescribed optical power for an eyewear lens. The modified photochromic poly(urea-urethane) may be slightly softer than the poly(urea-urethane) formed directly from the commercially available A-side and B-side materials mentioned herein, but is not prohibitively damageable when used in an eyewear lens.

Additional significant advantages obtain from embodiments of the invention in terms of photochromic performance. The inventors found that significantly improved fade-back speed results for the modified photochromic poly(urea-urethane) as compared to performance when the same photochromics are added directly to the commercially available A-side and B-side materials mentioned herein.

In another embodiment of the invention, the photochromic material was not incorporated into the A-side of the reactive mixture, but was applied to the modified poly(urea-urethane) layer after it had been formed via a tint bath. Advantageously, the observed fade-back speed for this embodiment was also faster as compared to analogous tinting of a layer of poly(urea-urethane) prepared from the commercially available A-side and B-side materials without any added polyols.

Surprisingly, the depth of coloration was not compromised by the fast responsiveness of the modified photochromic poly(urea-urethane). This is a surprising and highly advantageous result, because normally as speed of response increases, the lens may not get as dark. One can understand this trade-off in properties due to the ease of rotation or reconfiguration of the photochromic molecule; if it is free to rotate and change configuration, the speed of response increases. However, that freedom of movement typically indicates it is not held in its new position, and it can easily revert and may not achieve as dense a color. Embodiments of the invention comprising the modified photochromic poly(urea-urethane) can advantageously balance in this modified polymer matrix the freedom of movement with a structure that can allow significant development of photochromic color density.

This can be seen in the following non-limiting examples.

Examples

Preparation of Modified A-Side with Photochromic Materials.

Proprietary naphthopyran photochromic materials (Tokuyama Corp., Tokyo, Japan), were added as % by weight to commercially available (PPG Industries, Inc.) Trivex® A-side optical-grade clear polyurethane pre-polymer. Mixtures of two or more photochromic materials were combined to achieve a more neutral, greyish color upon activation. Approximately 0.75-1% by weight of a commercially available (Axel Plastics Research Laboratories, Inc., Woodside, N.Y.) internal mold release agent was added to the A-side mixture to prevent adhesion of the exothermically reacting material to glass molding surfaces. The photochromic dyes and release agent were allowed to mix with the A-side polyurethane pre-polymer, under dry nitrogen for 1-2 hours at 50° C. before use in forming the modified photochromic poly(urea-urethane).

Preparation of Modified B-Side.

For a set of experiments, a quantity (mass) of B-side reactive mixture was chosen. Then the reactants and catalyst were added by mass percentage to create this total mass. Polyols, as identified in the descriptions below, were chosen to combine with commercially available (PPG Industries, Inc.) Trivex® B-side optical-grade polyamine (diethyltoluene diamine). A commercially available catalyst, K-Kat XK-604 (King Industries, Inc.) was added at 1.1% of the mass chosen for the B-side. The percentage by weight of polyol was selected and loaded (under nitrogen) into the B-side holding tank. Then commercially available (PPG Industries, Inc.) Trivex® B-side optical-grade polyamine (diethyltoluene diamine) was added to make up the remainder of this chosen mass. The mixture was stirred under nitrogen at room temperature for 30-60 minutes prior to use.

Formation of the Eyewear Lens.

For each of these Examples and comparative examples, the B:A equivalent weight ratio was set to a desired and constant value of 0.95:1 in terms of total B-side reactant species to 1 equivalent weight of excess NCO reactive species on the A-side. For the comparative examples, the B-side reactant species were only amine groups (i.e., $B_{TOT} = B_{NH2} = 0.95$); for the other Examples, $B_{TOT} = 0.95 = B_{OH} \, B_{NH2}$. In each example, the component $B_{OH}$ and $B_{NH2}$ equivalent weight values are listed in Table 1. Since the molecular weight and functionality of both the polyol(s) and diethyltoluene diamine are known, one can determine the grams of A-side that need to combine with grams of B-side to react at a B:A equivalent weight ratio of 0.95:1. A commercial reactive processing machine (Max Machinery, Healdsburg, Calif.) was used to hold the A-side and B-side mixtures at controlled temperatures, and then mix and dispense them into molds at controlled temperatures and flow rates. For these experiments, the A-side tank and its delivery lines were maintained at 150° F. (65° C.), and the B-side tank and its delivery lines were maintained at not less than 110° F. (≥43° C.). For these experiments, the A-side flow rate was set at 140 g/min. The B-side flow rate was adjusted to maintain the 0.95:1 equivalent weight ratio, based on the percentage and properties of the polyol and the amount of diamine present in the B-side mixture. For example, when no polyol was present, the B-side flow rate was set to 33 g/min. When 75% by mass of polyol (1) was added to the B-side mixture, the flow rate was 73 g/min.

The modified A-side and the B-side materials (which are either modified for the exemplary embodiments, or commercially available, for the comparative examples) were thoroughly mixed and dispensed into mold assemblies that had been pre-heated to 100° C. for 5-10 minutes. For these experiments, the mold assemblies were formed of a single vision semi-finished (SVSF) lens blank that served as element 10 as described in FIG. 1, and a spherical glass concave mold held in a fixed position by a gasket supporting both the edge of the mold and the edge of the lens blank, and creating an enclosed cavity between them. The gasket held the molding surface approximately 0.5 mm away from the outer (convex) lens blank surface.

The lens blanks used as parts of the mold assemblies for these examples were made of either clear thermoplastic polycarbonate or of clear Trivex poly(urea-urethane) material. These Trivex poly(urea-urethane) lens blanks were made with the commercially available A-side and B-side reactants as delivered from the supplier, with no additional polyols and no photochromic materials added.

The modified A-side and either commercially available B-side materials or the modified B-side materials were mixed and dispensed into the mold assemblies, and the assemblies were then allowed to rest at room temperature for about 5 minutes before placing them in a controlled curing oven. Different cure times and temperature were chosen, as indicated in Table 1 below.

Photochromic Measurements on the Optical Articles.

Measurements on the semi-finished eyewear lens blanks were obtained using BPC300 Photochromic Lens Characterisation System (Bentham Instruments Ltd, Reading, Berkshire, U.K.). The activation source is a Xenon lamp that approximates solar irradiance with an air mass 1.5 filter. Lens samples were held at 23° C. and irradiated for 3 minutes while the visible spectrum was recorded. Then the solar activation source was blocked, and the spectral response during fade-back was recorded over 10 minutes.

From this data, luminous transmittance for the sample was calculated in accordance with the American National Standards Institute (ANSI) Z80.3-2015 *Standard for Ophthalmics—Nonprescription Sunglass and Fashion Eyewear Requirements* (illuminant C reference) for the sample at rest [that is, unexposed to light that would activate the sample's photochromic material(s)] and for the sample in the darkest state with its photochromic material(s) activated. In addition, the darkening rate and fade-back rate were monitored by observing and recording each lens sample's percent transmittance at 555 nm throughout the 3-minute activation period and the 10-minute fade-back period. This is shown, for example, in FIG. 2 for two of the eyewear lenses identified below. Note that time=zero corresponds to the instant of blocking the activation source, while negative time values record the period of exposure to the Xenon source approximating solar irradiance, and positive time values record sample response during fade-back (lightening) of the photochromic lens after the solar irradiance was blocked.

The range of photochromic response was determined by noting the initial % T (rest transmittance) at 555 nm and the darkest (lowest) % T recorded during activation. The time it took for the eyewear lens to reach the % T value at half of this range was reported as $t_{1/2}D$ (time to reach half the ultimate darkness of the lens). Once the activating source was blocked, $t_{1/2}F$ (time to fade back from half the ultimate darkness of the lens) was then reported as the time it took for the lens to recover to this same % T value as recorded during the darkening cycle.

Examples of the invention, and comparative photochromic lens samples (C1, C4 and C9) are summarized in Table 1 below. Comparative lens samples C1, C4 and C9 are made using the same modified A-side compositions but non-modified, commercially available B-side material, with no added polyols. As an additional comparison, the last entry (S15) shows the photochromic performance for a 1% solution of one set of the photochromic dyes in toluene.

TABLE 1

Eyewear lens composition and photochromic response

| Ex. | Polyol | % polyol added to B-side (by mass) | $B_{OH}$ eq. wt (vs. 1.0 excess NCO A-side) | $B_{NH2}$ eq wt (vs. 1.0 excess NCO A-side) | % photo-chromics added | Photo-chromic mix | Element 10 (SVSF lens blank) | Cure time & temp (° C.) | Luminous T (% darkest state, Illum. C) | $t_{1/2}D$ (s) | $t_{1/2}F$ (s) |
|---|---|---|---|---|---|---|---|---|---|---|---|
| C1 | NONE | 0% | 0.00 | 0.95 | 1.00% | A | PC | 130° C. 6 hr | 15.2% | 8 | 90 |
| 2 | (1) | 75% | 0.43 | 0.52 | 1.00% | A | PC | 130° C. 6 hr | 7.0% | 4 | 38 |
| 3 | (2) | 75% | 0.49 | 0.46 | 1.00% | A | PC | 130° C. 6 hr | 13.3% | 7 | 109 |
| C4 | NONE | 0% | 0.00 | 0.95 | 1.00% | B | Tril | 40° C. 3 hr | 29.6% | 16 | 131 |
| 5 | (1) | 12.5% | 0.04 | 0.91 | 1.00% | B | Tril | 40° C. 3 hr | 17.2% | 12 | 112 |
| 6 | (1) | 25% | 0.08 | 0.87 | 1.00% | B | Tril | 40° C. 3 hr | 14.4% | 10 | 100 |
| 7 | (1) | 37.5% | 0.135 | 0.815 | 1.00% | B | Tril | 40° C. 3 hr | 10.8% | 9 | 88 |
| 8 | (1) | 75% | 0.43 | 0.52 | 1.00% | B | Tril | 40° C. 3 hr | 9.3% | 4 | 39 |
| C9 | NONE | 0% | 0.00 | 0.95 | 1.55% | C | PC | 40° C. 3 hr | 12.1% | 8 | 102 |
| 10 | (1) | 25% | 0.08 | 0.87 | 1.55% | C | PC | 40° C. 3 hr | 9.4% | 5 | 78 |
| 11 | (1) | 50% | 0.205 | 0.745 | 1.55% | C | PC | 40° C. 3 hr | 7.2% | 4 | 74 |
| 12 | (1) | 75% | 0.43 | 0.52 | 1.55% | C | PC | 40° C. 3 hr | 7.8% | 4 | 43 |
| 13 | (1) | 75% | 0.43 | 0.52 | 1.00% | A | PC | 70° C. 3 hr | 11.2% | 4 | 37 |
| 14 | (3) | 65% | 0.52 | 0.43 | 0.75% | A | PC | 70° C. 3 hr | 11.8% | 7 | 72 |
| S15 | NONE | 0% | — | — | 1.00% | D | Toluene solution | N/A | 7.2% | 3 | 37 |

Notes for Table 1

PC nominal 6B clear polycarbonate single vision semi-finished lens blank, ~10 mm thick Tril nominal 6B clear single vision semi-finished poly(urea-urethane) lens blank made of Trivex A and B materials, ~8 mm thick. The clear lens blank was produced with no added polyol in the B-side reactants, and no photochromic materials.

(1) Poly THF 650 (BASF Corp., Florham Park, NJ), polyether diol based on tetrahydrofuran, MW = 650; functionality = 2

(2) Multranol 8162 (Covestro, Leverkusen Germany), sucrose-based polyether polyol, MW = 588, functionality = 4.3

(3) ETERNACOLL ® PH50 (UBE Chemical Europe, S. A.), polycarbonate diol, MW = 500, functionality = 2

Figure 2:
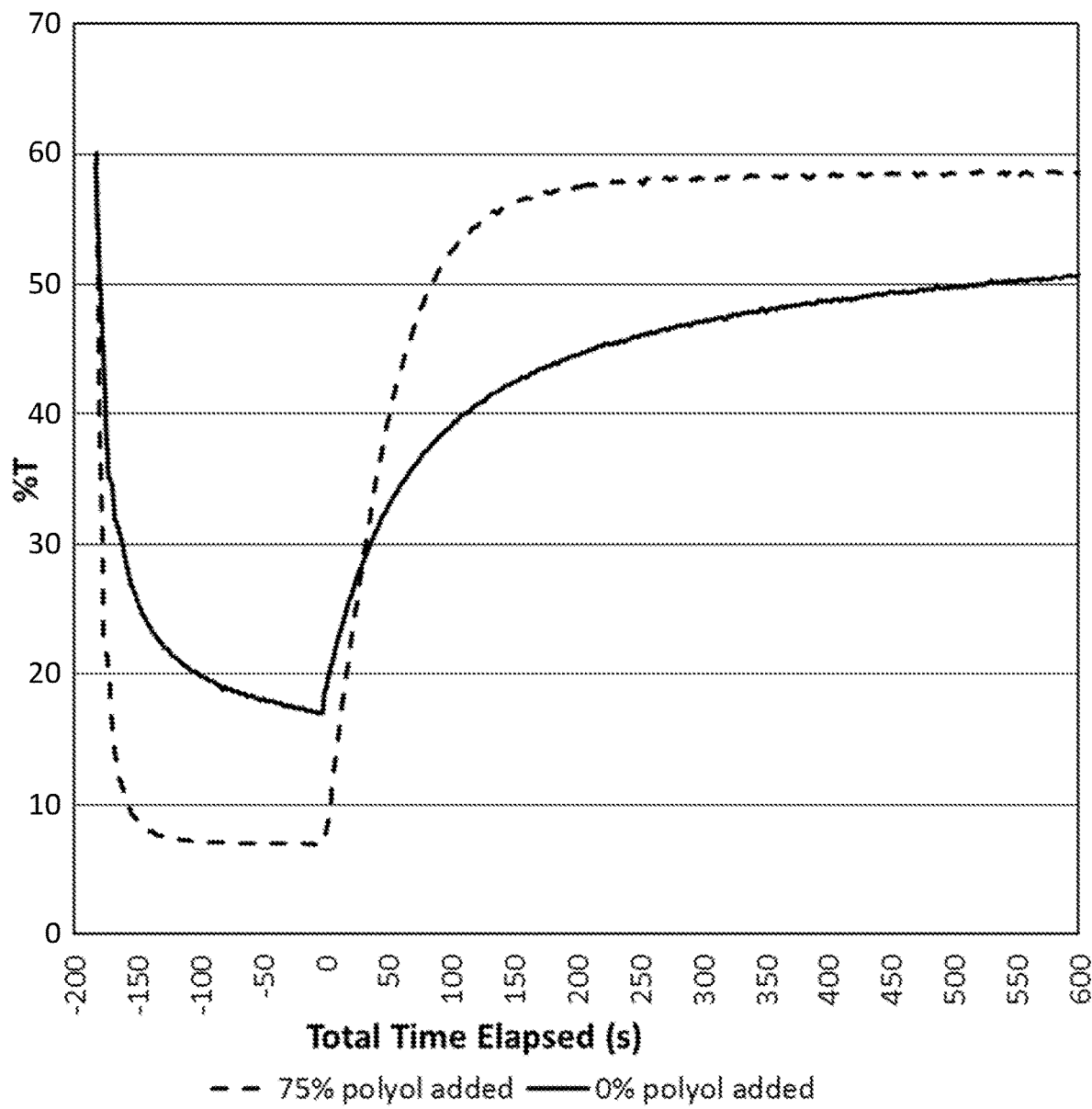
FIG. 2 shows an exemplary comparison of the photochromic performance for two spectacle lens blanks (each approximately 10.5 mm in total thickness), one formed in accordance with an embodiment of the invention (dotted line), and one formed by the addition of photochromic materials to commercially available materials (solid line). Transmittance of each lens blank at 555 nm vs. time of exposure to activating energy is shown along the x-axis, with fade-back shown starting at time=zero, when the activating energy was blocked.

A mixture of 0.62% of a naphthopyran compound that exhibits blue color upon UV activation; 0.33% of a naphthopyran compound that exhibits orange color upon UV activation and 0.05% of a naphthopyran compound that exhibits yellow color upon UV activation B mixture of 0.65% of a naphthopyran compound that exhibits blue color upon UV activation; 0.35% of a naphthopyran compound that exhibits orange color upon UV activation C same three dyes as in A, but mixture of 0.96%, 0.52% and 0.07% of each dye, respectively D same three dyes as in A, but mixture of 0.65%, 0.35% and 0.052% of each dye, respectively FIG. 2 shows the % T at 555 nm during activation by exposure to the solar simulation light source, and then fade-back when the light source is blocked, for two different eyewear lens samples. The two samples plotted in FIG. 2 are Example C1 (solid line) and Example 2 (dotted line), as described in detail in Table 1. The dotted line plot in FIG. 2 shows the responsiveness of a photochromic lens blank formed according to an embodiment of the invention, comprising a layer of modified photochromic poly(urea-urethane) formed on a polycarbonate single vision, semi-finished lens blank (total lens thickness of about 10.5 mm). The modified photochromic poly(urea-urethane) layer is prepared according to one embodiment of the invention by addition of photochromic materials to the A-side polyurethane pre-polymer, and reaction of this modified A-side with a modified B-side reactant mixture comprising both polyamine and added polyol. For comparison, the solid line in FIG. 2 shows the responsiveness of a comparative photochromic lens blank (C1) comprising a layer of photochromic poly(urea-urethane) formed by reaction of the same photochromic, modified A-side with only the commercially available B-side materials (with no added polyols), the layer being formed onto a polycarbonate single vision, semi-finished lens blank (total lens thickness of about 10.5 mm In the elapsed time sequence, negative values correspond to the time during activating light exposure, starting at time t=−180 seconds; time t=zero marks the time at which the excitation source is blocked, and positive times record the fade-back of the sample.

FIG. 2 illustrates an advantage of this embodiment of the invention by showing a comparative example. In Example C1, the commercially available B-side material contains only $NH_2$ reactive species that combined with the excess NCO reactive groups of the A-side at an equivalent weight ratio of B:A=0.95 $NH_2$:1 NCO. In Example 2, a polyether diol is added to modify the B-side reactive species, such that instead of only 0.95 $NH_2$ species to react at an equivalent weight ratio of 0.95 with the 1.0 equivalent weight of excess NCO species on the A-side, the B-side now comprises 0.43 equivalent weights of OH species+0.52 equivalent weights of $NH_2$ species ($B_{TOT}$=0.95, wherein $B_{OH}$=0.43 and $B_{NH2}$ = 0.52). As shown in FIG. 2, the eyewear lens of Example 2 made according to this embodiment of the invention reaches a darker state and fades back more quickly than when the same photochromic dye mix is added to the poly(urea-urethane) layer of Example C1 (made with non-modified B-side materials).

Example 3 used a polyol rather than a diol, and this combination did not achieve as favorable results as the polyether diol of Example 2. This may be due to more extensive cross-linking with this polyol reactive mixture.

The group of Examples C4 and 5-8 in Table 1 demonstrate the improved fade-back rates and increased degree of coloring (lower luminous transmittance) as the percentage of polyol modifying the photochromic poly(urea-urethane) is increased. Note that both the fade-back rate and the overall darkening of the lens are improved. These results were achieved even with a different photochromic dye mixture, different cure conditions, and a different element 10. This indicates that there may be a wide window of operation for this invention.

A similar trend of improved fade-back and good darkening are demonstrated with Examples C9 and 10-12. The higher photochromic dye concentration can mitigate some of the differences between these conditions because there is more material available for response. Comparing these examples with the results for examples C9 and 5-8 suggests that embodiments of the invention can advantageously be practiced with lower concentrations of the expensive photochromic materials.

Examples 13 and 14 compare results for a polyether diol and a polycarbonate diol. An improvement in fade-back is observed in each case, but may indicate different degrees of influence. The experimental conditions are not identical, however, and this may account for some of the difference in the results observed. Comparing these results with Example 3 suggests that diols may be preferable to polyols for improving the fade-back rate.

Both examples 13 and 14 (made with different polyols), and many of the Examples made with lower concentrations of polyol (1) show demonstable improvement over the photochromic performance of the non-modified poly(urea-urethane). These Examples show that a considerable range of conditions can be used while practicing various embodiments of the invention and can result in marked improvement in photochromic response. Such results and the good range of working conditions can be extremely useful for manufacturing, allowing process flexibility and good control.

As shown in Example S15, the same photochromic materials were dissolved in toluene to provide a comparison with conditions that should allow maximum speed and darkening; the photochromic molecules have almost no physical constraints to rotation or reconfiguration in this solution. Interestingly, the eyewear lenses of these exemplary embodiments of the invention made with 75% polyol (1) added to form the modified photochromic poly(urea-urethane) [see Examples 2, 8, 12 and 13] gave fade-back rates very comparable to the very fast rates observed for solution S15, and similarly low (dark) values of luminous T. These non-limiting examples illustrate that one can significantly improve fade-back rates while maintaining or improving the darkness of the fully exposed lens. In the particular examples of the invention, with the exemplary polyether diol designated polyol (1), fade rates were improved by 10-70% vs. the non-modified poly(urea-urethane); the luminous transmittance was also improved. Example 14 suggests that there may be a difference in the range of effects with different polyols, but significant improvements in fade-back rate are still achieved. The eyewear lens of certain embodiments of the invention can exhibit fade-back rates at least 10% faster than non-modified photochromic poly(urea-urethane); in other embodiments, greater than 20% improvement in fade-back rate; in other embodiments, greater than 30% improvement in fade-back rate; in other embodiments, greater than 40% improvement in fade-back rate; and in other embodiments, greater than or equal to 50% improvement in fade-back rate can be achieved when the modified photochromic poly(urea-urethane) is used in an optical article. In each of these instances, surprisingly, the maximum darkness of the activated eyewear lens is at least comparable to or darker than a lens comprising the non-modified photochromic poly(urea-urethane). These are demonstable improvements in performance.

Although the invention has been disclosed in detail with reference to exemplary embodiments, and multiple variations or derivatives of these embodiments, one skilled in the art will appreciate that additional substitutions, combinations, and modifications are possible without departing from the concept and scope of the invention. These and similar variations would become clear to one of ordinary skill in the art after inspection of the specification and the drawings herein.

The invention claimed is:

1. A process for producing a photochromic eyewear lens comprising:
forming at least one layer of modified photochromic poly(urea-urethane) by combining
(a) at least one photochromic material, and
(b) a reaction product of:
(b1) a polyurethane pre-polymer prepared by the reaction of cycloaliphatic diisocyanate and at least one polyol in an equivalent weight ratio of about 2.5 to 4.0 NCO reactive groups/1.0 OH reactive groups, wherein the resultant polyurethane pre-polymer has excess NCO reactive groups;
(b2) a mixture of diethyltoluene diamine and one or more polyols, wherein each of the one or more polyols of the mixture has a molecular weight less than 1200; wherein the mixture provides OH and $NH_2$ reactive groups; wherein the combined equivalent weight of OH and $NH_2$ reactive groups in the mixture is expressed as $$B_{TOT}=B_{OH}+B_{NH2} \quad (1)$$

wherein $B_{OH}$ is the equivalent weight of OH reactive groups in the mixture and $B_{NH2}$ is the equivalent weight of $NH_2$ reactive groups in the mixture and $B_{TOT}$ of the mixture is in the range of about 0.75 to about 1.10 for each 1.0 equivalent weight of excess NCO reactive groups in the polyurethane pre-polymer; and wherein $B_{OH}$, is at least 0.08 and $B_{NH2}$ is at most 0.67; and
(b3) one or more catalysts provided in a total weight percent of about 0.5% to about 1.1% of the total weight of mixture (b2).

2. The process of claim 1, wherein the one or more catalysts (b3) is added to the mixture (b2) before reacting the mixture of (b2) and the polyurethane pre-polymer (b1).

3. The process of claim 1, wherein the one or more catalysts is any one or a combination selected from the group consisting of: an organometallic compound and a tertiary amine.

4. The process of claim 3, wherein the organometallic compound is selected from the group consisting of: organometallic tin compounds, organometallic zinc compounds, organometallic zirconium compounds and mixtures thereof.

5. The process of claim 1, wherein $B_{OH}$ is at least 0.20.

6. The process of claim 1, wherein $B_{NH2}$ is at most 0.67.

7. The process of claim 1, wherein $B_{TOT}$ does not exceed 0.95 for each 1.0 equivalent weight of excess NCO reactive groups of the polyurethane pre-polymer.

8. The process of claim 1, wherein $B_{OH}$ is at least 0.40.

9. The process of claim 1 further comprising forming the at least one layer of modified photochromic poly(urea-urethane) on a lens element comprising one or more lens materials selected from the group consisting of: thermoplastic polycarbonate, hard resin thermoset polymers, poly(urea-urethanes), polythiourethanes, episulfides, other sulfur-containing polymers with refractive indices higher than about 1.56, polystyrenes, polyamides, optical-grade nylon polymers, acrylics, polyacrylates, and polymethacrylates.

10. The process of claim 9, further comprising applying one or more coatings to at least one of the modified photochromic poly(urea-urethane) layer and the lens element, wherein the one or more coatings are selected from the group consisting of: hard coatings, hydrophobic coatings, anti-fog coatings, moisture-barrier coatings, mirror coatings, visible light anti-reflective coatings, ultraviolet light anti-reflective coatings, electrochromic coatings, polarizing coatings, polarizing multilayer thin film coatings, multilayer interference coatings, conductive coatings, visible light-filtering coatings, ultraviolet light-filtering coatings and infrared light-filtering coatings.

11. The process of claim 1, further comprising adding one or more additives to the modified photochromic poly(urea-urethane) layer selected from the group consisting of: mold release agents, thermal or light stabilizers, UV absorbers, dyes or tints, pigments, antioxidants, chain extenders, color blockers, optical brighteners, surfactants, plasticizers, and inert impact modifiers.

12. The process of claim 1, wherein the at least one photochromic material is selected from the group consisting of: silver halides, dichroic metal oxides, dichroic organic dyes, thermochromics, spiro(indoline)pyrans, naphthopyrans, benzopyrans, dithizonates, benzoxazines, spirooxazines, spiro(indoline)naphthoxazines, spiro-pyridobenzoxazines, anthroquinones, oxazines, indolizines, fulgides, and fulgimides.

13. The process of claim 1, wherein the at least one photochromic material comprises at least two photochromic materials, wherein at least one of the photochromic materials is activated by visible light.

14. The process of claim 1, wherein the process of combining the at least one photochromic material with the reaction product of steps (b1)(b3) comprises mixing the photochromic material with the polyurethane pre-polymer.

15. The process of claim 1, wherein the process of combining the at least one photochromic material with the reaction product of steps (b1)(b3) comprises contacting the reaction product with the at least one photochromic material, and imbibing the at least one photochromic material into the reaction product.

16. A process for producing a photochromic eyewear lens comprising:
forming at least one layer of modified photochromic poly(urea-urethane) by combining
(a) at least one photochromic material, and
(b) a reaction product of:
(b1) a polyurethane pre-polymer prepared by the reaction of cycloaliphatic diisocyanate and at least one polyol in an equivalent weight ratio of about 2.5 to 4.0 NCO reactive groups/1.0 OH reactive groups, wherein the resultant polyurethane pre-polymer has excess NCO reactive groups;
(b2) a mixture of diethyltoluene diamine and one or more polyols, wherein each of the one or more polyols of the mixture has a molecular weight less than 1200; wherein the mixture provides OH and $NH_2$ reactive groups; wherein the combined equivalent weight of OH and $NH_2$ reactive groups in the mixture is expressed as $$B_{TOT}=B_{OH}+B_{NH2} \quad (1)$$

wherein $B_{OH}$ is the equivalent weight of OH reactive groups in the mixture and $B_{NH2}$ is the equivalent weight of $NH_2$ reactive groups in the mixture and $B_{TOT}$ of the mixture is in the range of about 0.75 to about 1.10 for each 1.0 equivalent weight of excess NCO reactive groups in the polyurethane pre-polymer; and wherein $B_{OH}$, is at least 0.04; and
(b3) one or more catalysts provided in a total weight percent of about 0.05% to about 1.1% of the total weight of mixture (b2); and
forming the at least one layer of modified photochromic poly(urea-urethane) on a lens element, wherein combining (a) and (b) produces the at least one layer of modified photochromic poly(urea-urethane) that formed on the lens element has at least a 10% faster fade-back rate as measured as transmittance at 555 nm when the at least one photochromic material is activated, as compared to a poly(urea-urethane) layer comprising (a) and the reaction product of polyurethane pre-polymer (b1) reacted only with diethyltoluene diamine in an equivalent weight ratio in the range of about 0.75 to about 1.2 $NH_2$/1.0 excess NCO reactive groups of the polyurethane pre-polymer (b1).

17. A process for producing a photochromic eyewear lens comprising:
   forming at least one layer of modified photochromic poly(urea-urethane) by combining
   (a) at least one photochromic material, and
   (b) a reaction product of:
      (b1) a polyurethane pre-polymer prepared by the reaction of cycloaliphatic diisocyanate and at least one polyol in an equivalent weight ratio of about 2.5 to 4.0 NCO reactive groups/1.0 OH reactive groups, wherein the resultant polyurethane pre-polymer has excess NCO reactive groups;
      (b2) a mixture of diethyltoluene diamine and one or more polyols, wherein each of the one or more polyols of the mixture has a molecular weight less than 1200; wherein the mixture provides OH and $NH_2$ reactive groups; wherein the combined equivalent weight of OH and $NH_2$ reactive groups in the mixture is expressed as $$B_{TOT} = B_{OH} + B_{NH2} \qquad (1)$$

wherein $B_{OH}$ is the equivalent weight of OH reactive groups in the mixture and $B_{NH2}$ is the equivalent weight of $NH_2$ reactive groups in the mixture and $B_{TOT}$ of the mixture is in the range of about 0.75 to about 1.10 for each 1.0 equivalent weight of excess NCO reactive groups in the polyurethane pre-polymer; and wherein $B_{OH}$, is at least 0.04; and
      (b3) one or more catalysts provided in a total weight percent of about 0.05% to about 1.1% of the total weight of mixture (b2); and
   forming the at least one layer of modified photochromic poly(urea-urethane) on a lens element,
   combining (a) and (b) produces the at least one layer of modified photochromic poly(urea-urethane) that formed on the lens element, has a visible luminous transmittance when activated by a Xenon lamp that approximates solar irradiance with an air mass 1.5 filter, of less than 15% but greater than 8%, wherein the visible luminous transmittance is calculated according to ANSI Z80.3-2015 Standard for Ophthalmics-Nonprescription Sunglass and Fashion Eyewear Requirements.

18. A photochromic eyewear product comprising the photochromic optical articles of claim 1.

\* \* \* \* \*